United States Patent
Amir et al.

(10) Patent No.: US 10,261,736 B2
(45) Date of Patent: Apr. 16, 2019

(54) ORDERING JOBS IN A PRINT QUEUE BASED ON PREPARATION AND PRINT TIMES

(71) Applicant: HEWLETT-PACKARD INDIGO B.V., Amstelveen (NL)

(72) Inventors: Gideon Amir, Ness Ziona (IL); Dror Kella, Nes-Ziona (IL)

(73) Assignee: HP Indigo B.V., Amstelveen (NL)

( * ) Notice: Subject to any disclaimer, the term of this patent is extended or adjusted under 35 U.S.C. 154(b) by 169 days.

(21) Appl. No.: 14/914,488

(22) PCT Filed: Aug. 29, 2013

(86) PCT No.: PCT/EP2013/067933
§ 371 (c)(1),
(2) Date: Feb. 25, 2016

(87) PCT Pub. No.: WO2015/028074
PCT Pub. Date: Mar. 5, 2015

(65) Prior Publication Data
US 2016/0210087 A1    Jul. 21, 2016

(51) Int. Cl.
*G06F 3/12*     (2006.01)
(52) U.S. Cl.
CPC ............. *G06F 3/124* (2013.01); *G06F 3/126* (2013.01); *G06F 3/1217* (2013.01); *G06F 3/1256* (2013.01); *G06F 3/1282* (2013.01)
(58) Field of Classification Search
CPC ...... G06F 3/124; G06F 3/1256; G06F 3/1217; G06F 3/126
USPC ........................................................ 358/1.15
See application file for complete search history.

(56) References Cited

U.S. PATENT DOCUMENTS

| | | | |
|---|---|---|---|
| 6,559,958 B2* | 5/2003 | Motamed | G06K 15/1857 358/1.13 |
| 8,023,133 B2 | 9/2011 | Kaneko | |
| 8,102,549 B2 | 1/2012 | Morales et al. | |
| 8,237,964 B2* | 8/2012 | Fan | G06F 3/126 358/1.13 |
| 2010/0238484 A1 | 9/2010 | Komine | |
| 2012/0062933 A1 | 3/2012 | Zeng et al. | |
| 2012/0075662 A1 | 3/2012 | Giannetti | |

(Continued)

FOREIGN PATENT DOCUMENTS

| CN | 101131627 | 2/2008 |
|---|---|---|
| JP | 2007331178 | 12/2007 |

OTHER PUBLICATIONS

Job Shop Scheduling. Retrieved from http://courses.washington.edu/ie337/ on Jun. 19, 2017.*

(Continued)

*Primary Examiner* — Eric A. Rust
(74) *Attorney, Agent, or Firm* — HP Inc. Patent Department (57) ABSTRACT

In an example implementation, a processor-readable medium stores code representing instructions that when executed by a processor cause the processor to receive a list of print jobs, and calculate a preparation time and a printing time for each job in the list. The instructions further cause the processor to generate an ordered print job queue that minimizes printing press downtime by maximizing an amount of the preparation time fulfilled during the printing time.

13 Claims, 4 Drawing Sheets

(56) References Cited

U.S. PATENT DOCUMENTS

2012/0194830 A1 8/2012 Gaertner et al.
2016/0034229 A1* 2/2016 Yamaguchi .......... H04N 1/0032
358/1.13

OTHER PUBLICATIONS

Malcolm G. Keif; Cost-Estimating for Commercial Digital Printing; Proc. of SPIE—IS&T Electronic Imaging, SPIE vol. 6500, 65000M; pp. 1-9; Jan. 25, 2007.
"HP Increases Quality and Productivity with New PageWide Web Presses"; Press Release—Sep. 13, 2015.
"HP Indigo 12000 Digital Press"; Informational Brochure; Sep. 2017.
S.M. Johnson; "Optimal Two and Three Stage Production Schedules with Set-Up Time Included"; The Rand Corporation; Reprinted from the Naval Research Logistics Quarterly 1 (1954) pp. 61-68.

* cited by examiner

ORDERING JOBS IN A PRINT QUEUE BASED ON PREPARATION AND PRINT TIMES

BACKGROUND

Print service providers often operate a single printing press, such as a digital LEP (liquid electrophotography) printing press, to handle general commercial printing (GCP) jobs. A digital printing press is a high-speed, digital, industrial inkjet printing solution suitable for printing various GCP print jobs including, for example, high volume transaction jobs, direct mail jobs, book jobs and publishing jobs. Digital printing presses include webfed presses that print onto a continuous media web supplied by a roll of media from an unwinding device, and sheetfed presses that print onto precut media sheets supplied by one or more input media trays.

Print data delivered to a printing press generally includes a number of GCP print jobs in a list of jobs that are scheduled for printing. However, the print jobs have usually not yet been approved for printing, and each job on a list is different than the next. Consequently, a verification and calibration process is typically performed on each job before it is printed. This process often includes printing and examining one or more sample sheets from a print job to proof and/or color match the job. Proofing and color matching can involve making adjustments to the press in an iterative fashion to calibrate the press for job-related parameters and to verify that a print job will be printed correctly. Unfortunately, during these verification and calibration iterations the press is usually stopped (i.e., not printing). This creates periods of down-time that lower overall press productivity. Because the press utilization rate directly impacts the profitability of printing businesses, efforts to reduce down-time and increase press productivity are ongoing.

BRIEF DESCRIPTION OF THE DRAWINGS

The present embodiments will now be described, by way of example, with reference to the accompanying drawings, in which.

Throughout the drawings, identical reference numbers designate similar, but not necessarily identical, elements.

DETAILED DESCRIPTION

Overview

As noted above, digital printing presses are mostly idle (i.e., not printing) during a print job preparation and approval process that involves the use of sample prints to calibrate the press and verify each print job. In a general commercial printing (GCP) environment, a digital press typically receives a group of different print jobs on a job list that are scheduled for printing. Prior to approving the jobs for printing, a press operator may be instructed to perform various proofing and/or preparation steps. The instructions for these steps are commonly referred to as the "job ticket", and they are usually in the form of a physical set of written instructions that may also be accompanied by sample prints. The instructions may also appear either partly or completely in digital form attached in some manner to the digital job itself. As one example, a job ticket may instruct the operator to print a sample of the job and to proof the sample. A standard proof usually involves the operator reviewing the printed sample to ensure that text and graphics are in the correct locations, that the correct fonts have been used, and so on. The operator can then approve the proofed sample or send it on to quality assurance or the client for approval. Another step that press operators are often instructed to perform is a color matching step to match colors between an existing approved sample and the current press output of the same or similar job on the press. Color matching takes more time than a standard proof, and it typically involves printing several samples while an operator reviews each sample and iteratively adjusts the color registration of the press between each sample until the color matching is correct. Such changes to the color profile are made either directly on the press or by iterative changes on the RIP (raster image processing) and re-RIP of the job. Job tickets can also include instructions directing the operator to perform various additional preparation steps that account for other print parameters. After each job is prepared (i.e., proofed, color matched, etc.) and approved, it is either printed immediately or put in sequence with other approved jobs.

Print service providers (PSP's) often operate printing presses in a serial production mode, where the preparation and printing of each print job is performed sequentially. After one print job is prepared and printed, a next job is prepared and printed, and so on, until all the jobs are finished. During the time each job is being prepared, the press is stopped and does not print. Unfortunately, even when good printing practices and certain optimizations are used, operating the press in a serial production mode results in low press productivity. Good printing practices include, for example, sorting jobs by substrate type, having up-to-date substrate definitions to minimize calibrations, and loading substrates ahead of printing.

Press productivity can be increased by operating a printing press in a parallel, or continuous, printing mode. Digital presses have the general capability of printing one job to an output tray while simultaneously printing a sample of another job to a sample tray. This feature enables press operators to work in parallel with the press, preparing subsequent print jobs (i.e., proofing or color matching sample prints for job approval) while the press continues printing a current job. Thus, time spent preparing jobs that would result in stopping the press in a serial production mode, can instead be scheduled to run concurrently with the press as the press is printing other jobs.

As noted above, however, PSP's often do not take advantage of this parallel production mode, but instead operate their presses in a serial production mode. In addition, operating a press in parallel production mode presents the challenge of how best to order the print jobs so that printing times and job preparation times coincide in a way that minimizes press downtime. One method of ordering the jobs is to simply take them in the order in which they were submitted to the press, either by the order of their digital submission or by the order of the job tickets. Thus, the first job in the queue is prepared and then printed, and preparation of the second job begins when the first job starts printing, and so on. Unfortunately, because jobs have different printing and preparation times, this type of job ordering method often results in the press stopping. For example, if the print time of the first job is less than the preparation time of the second job, the press will finish printing the first job and then stop while it waits for the preparation and approval of the second job to be completed. Another method of ordering print jobs is to simply try all the different job ordering permutations and select jobs in an order that minimizes the non-printing time of the press. Unfortunately, as the number of print jobs in a print job queue increases, the number of different permutations grows quickly and becomes unmanageable for both human operators and computers.

A print job ordering algorithm disclosed herein orders the print jobs from a job list in a prioritized manner that allows job verification and calibration iterations to be performed on subsequent jobs while a current job is printing. Implementing the job ordering algorithm optimizes printing press productivity by minimizing the time the press is stopped (i.e., not printing). This effectively minimizes the time it takes to finish preparing and printing all the jobs in the list. The algorithm assesses each print job's preparation time and print time based on job and user-defined information parameters, and minimizes the downtime (i.e., non-printing time) of the press by maximizing the amount of job preparation time that is fulfilled during printing. Thus, the algorithm generates an optimal print order for the print jobs that maximizes the amount of assessed preparation time that runs simultaneously with assessed printing time.

Job parameters used to calculate a job's preparation and printing times provide information such as whether the job is a simplex job or a duplex job, whether the job calls for color matching, whether the job calls for a sample to be printed, and the number of impressions being printed for the job. In one example, preparation time for each job includes a "base time", plus a "duplex time" when the job is a duplex job, and a "color match time" when the job calls for color matching. The preparation time may also include adding time based on the number of sample pages being reviewed. The printing time is the product of an "impression time" multiplied by the number of impressions called for in the job. In one example, the job ordering algorithm employs Johnson's sorting rule to optimize the order in which the print jobs are to be prepared and printed, and to generate a corresponding ordered print queue. Johnson's sorting rule is a method generally used in the field of operations research to reduce the total amount of time to complete a group of jobs being operated on sequentially by two machines or processes by scheduling the jobs in an optimal sequence.

Illustrative Embodiments

Figure 1:
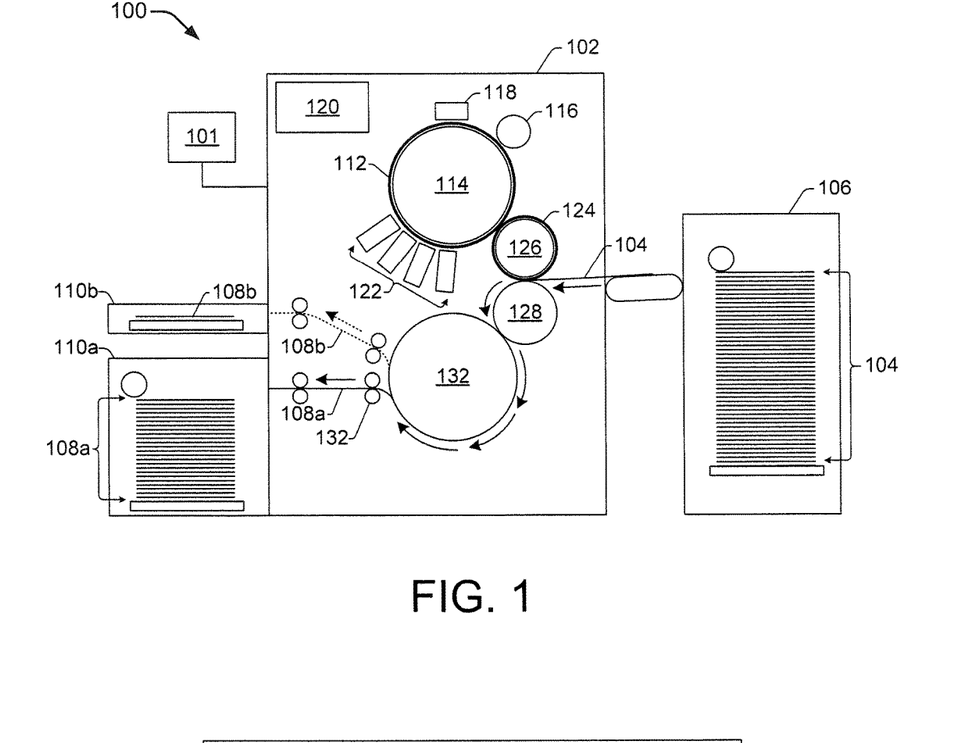
FIG. 1 shows an example of a printing device suitable for implementing a print job ordering algorithm to generate a print job order that allows simultaneous preparation and printing of print jobs.

FIG. 1 illustrates an example of a printing device 100 suitable for implementing a print job ordering algorithm to generate a prioritized print job order that allows print jobs to be prepared (e.g., by performing job verification/proofing and color calibration/matching iterations) while other jobs are printing. The printing device 100 comprises a print-on-demand device, such as a liquid electro-photography (LEP) printing press. A printing device 100 implemented as an LEP printing press 100 generally includes a user interface 101 that enables an operator to manage various aspects of printing, such as loading and reviewing print jobs, proofing and color matching print jobs, transferring approved print jobs to an approved print queue for printing, reviewing the order of the print jobs, handling media substrates, and so on. The user interface 101 typically includes a touch-sensitive display screen that allows the operator to interact with information on the screen, make entries on the screen, and generally control the press 100. A user interface 101 may also include other devices such as a key pad, a keyboard, a mouse, and a joystick, for example.

An LEP printing press 100 also includes a print engine 102 that receives print media 104 (e.g., cut-sheet paper) from one or more media input mechanisms 106, and outputs printed media, such as media 108a and 108b, to one or more media output mechanisms, such as trays 110a and 110b. In the example implementation shown in FIG. 1, the print engine 102 generates printed media in the form of printed jobs 108a and printed job sample sheets 108b. The print engine 102 outputs printed jobs 108a to an output stacker tray 110a and job sample sheets to a sample tray 110b.

The print engine 102 includes a photo imaging component, such as a photo imaging plate (PIP) 112 mounted on a drum or imaging cylinder 114. The PIP 112 defines an outer surface of the imaging cylinder 114 on which images can be formed. A charging component such as charge roller 116 generates electrical charge that flows toward the PIP surface and covers it with a uniform electrostatic charge. A laser imaging unit 118 exposes image areas on the PIP 112 by dissipating (neutralizing) the charge in those areas. Exposure of the PIP creates a 'latent image' in the form of an invisible electrostatic charge pattern that replicates the image to be printed.

After the latent/electrostatic image is formed on the PIP 112, the image is developed by a binary ink development (BID) roller 122 to form an ink image on the outer surface of the PIP 112. Each BID roller 122 develops one ink color in the image, and each developed color corresponds with one image impression. While four BID rollers 122 are shown, indicating a four color (i.e., CMYK) process, other press implementations may include additional rollers 122 corresponding to additional colors. The single color separation impression of the image developed on the PIP 112 is then electrically transferred from the PIP 112 to an image transfer blanket 124, which is electrically charged through an intermediate drum or transfer cylinder 126. The image transfer blanket 124 overlies, and is securely attached to, the outer surface of the transfer cylinder 126. The transfer cylinder 126 is configured to heat the blanket 124, which causes the liquid in the ink to evaporate and the solid particles to partially melt and blend together, forming a hot adhesive liquid plastic. The heated ink image impression is then transferred to a sheet of print media 104, which is held by an impression cylinder 128. This process is repeated for each color separation in the image, and the sheet of print media 104 remains on the impression cylinder 128 until all the color separation impressions (e.g., C, M, Y, and K) in the image are transferred to the sheet. After all the color impressions have been transferred to the sheet of print media 104, the printed media 108 sheet is transported by various rollers 132 from the impression cylinder 128 to the output mechanism 110.

In a digital LEP printing device 100, images are created from digital image data that represents words, pages, text and images that can be created, for example, with electronic layout and/or desktop publishing programs. A controller 120 uses the digital image data to control the laser imaging unit 118 to selectively expose the PIP 112. Digital image data is generally formatted as one or more print jobs stored and executed on controller 120, as further discussed below.

Figure 2:
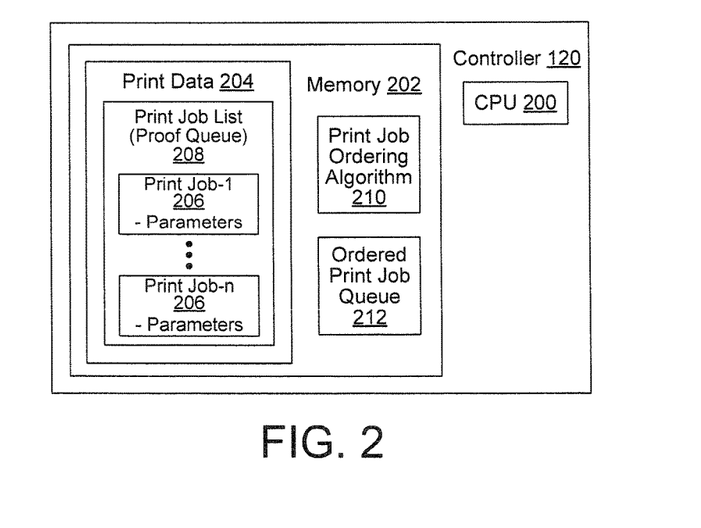
FIG. 2 shows a box diagram of a controller suitable for implementing a print job ordering algorithm that orders print jobs.

FIG. 2 shows a box diagram of a controller 120 suitable for implementing a print job ordering algorithm that orders print jobs in a prioritized manner that enables the preparation (e.g., proofing, and color matching) of print jobs while other jobs are printing on a printing device 100, such as an LEP digital printing press. Controller 120 generally comprises a processor (CPU) 200 and a memory 202, and may additionally include firmware and other electronics for communicating with and controlling the other components of print engine 102, as well as a user interface 101, and media input (106) and output (110a, 110b) mechanisms. Memory 202 can include both volatile (i.e., RAM) and nonvolatile (e.g., ROM, hard disk, floppy disk, CD-ROM, etc.) memory components comprising non-transitory computer/processor-readable media that provide for the storage of computer/processor-readable coded instructions, data structures, program modules, JDF, and other data.

As noted above, controller 120 uses digital image data to control the laser imaging unit 118 in the print engine 102 to selectively expose the PIP 112. More specifically, controller 120 receives print data 204 from a host system, such as a computer, and stores the data 204 in memory 202. Data 204 represents, for example, documents or image files to be printed. As such, data 204 forms one or more print jobs 206 for printing device 100 that each include print job commands and/or command parameters. In some implementations, controller 120 receives and stores print data 204 as a print job list 208 or proof queue that includes numerous print jobs 206 (i.e., print jobs 1-n). Using a print job 206 from data 204, controller 120 controls components of print engine 102 (e.g., laser imaging unit 118) to form characters, symbols, and/or other graphics or images on print media 104.

In one implementation, controller 120 includes a print job ordering algorithm 210 stored in memory 202. Print job ordering algorithm 210 comprises instructions executable on processor 200 to determine and generate a prioritized order for preparing and printing the available print jobs 206 from a print job list 208 received by the printing device 100. In one example, the algorithm 210 generates an ordered print job queue 212 that arranges the jobs 206 in a prioritized order for preparation and printing. In general, the job ordering algorithm 210 orders each of the print jobs 206 from a print job list 208 in a prioritized print order based on an estimated amount of preparation time (i.e., time for job verification, calibration, and approval) and print time for each job. The algorithm 210 calculates estimated job preparation times based on job information parameters that indicate whether the jobs are simplex or duplex, and whether the jobs call for a simple proof or for color matching. The algorithm 210 calculates the estimated job print times based on job information parameters that indicate the number of impressions to be printed, or whether the job just calls for printing a sample sheet. While the present implementation of algorithm 210 is described as using particular information parameters to estimate job preparation and printing times, there is no intent to limit the types or extent of other parameters that might also be appropriately used. Various other parameters related to the media substrate and other aspects of the press 100, for example, are also possible and are contemplated by this disclosure.

After algorithm 210 calculates estimated job preparation and printing times for each job 206 in a print job list 208, it applies Johnson's sorting rule to the estimated times to determine an ordered print job queue 212 that minimizes the total time for printing all the jobs 206 in the list 208. In addition to minimizing the total print time, the ordered print job queue 212 minimizes the amount of time between the preparation and printing of each job. Minimizing the preparation-to-printing time for each job helps to ensure that the calibration of the press 100 does not change between the time a job is prepared and the time the job actually prints. In one example, the ordering of jobs may be determined statically, where the order for a certain set of jobs is determined once. In some implementations the ordering of jobs may also be determined semi-dynamically, or numerous times, so as to re-optimize the job order based on a condition or event (as discussed below) that causes a gross deviation in preparation and/or printing times. In some implementations, the ordering of jobs may be determined on a fully dynamic basis, to continually re-optimize the job order based on continuing conditions or events that create deviations in preparation times, printing times, and other parameters. While Johnson's sorting rule is discussed as the method of determining an ordered print job queue, other methods may also be appropriately employed, such as A. Allahverdi and Y. Sotskov's, *Two-machine flowshop minimum-length scheduling problem with random and bounded processing times*, Int. Trans. Oper. Res. 10 (2003), no. 1, 65-76.

Figure 3:
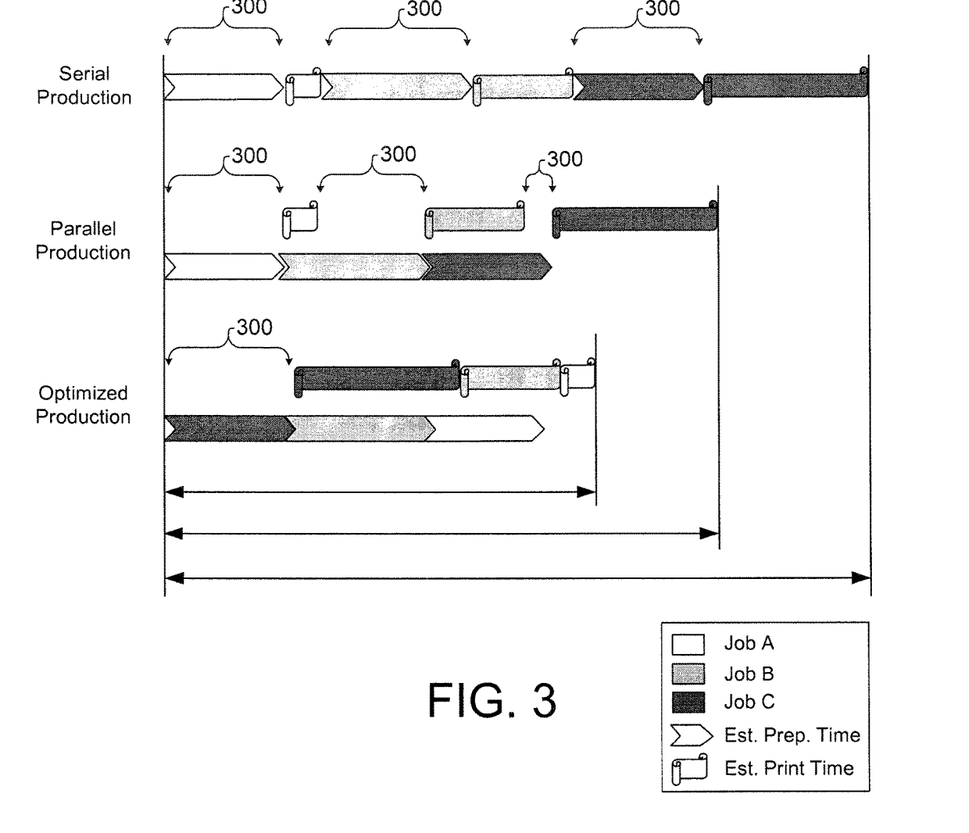
FIG. 3 shows an example implementation of the job ordering algorithm in a printing press using three example print jobs.

FIG. 3 illustrates an example implementation of the job ordering algorithm 210 in a printing press 100 using three example print jobs (job A, job B, job C). The illustration shows an example of optimized production from the press 100 that results from executing a job ordering algorithm 210, and it compares the result with examples of typical press productivity results that would otherwise be achieved using a serial production mode and a parallel production mode. Referring to FIG. 3, each job comprises an estimated preparation time and an estimated print time. In a serial production mode, the preparation and print times for each job are run sequentially so that job A is first prepared and then printed, followed by the sequential preparation and printing of job B, and then the sequential preparation and printing of job C. In a serial production mode, non-printing time 300 for the press is at a maximum, and the press productivity is minimized because the press sits idle during the combined preparation times of all the print jobs, A, B, and C.

In the parallel production mode, the print jobs are being printed in the order in which they were received by the press 100. Therefore, job A is prepared first, and then printed. When job A begins printing, the preparation of job B also begins. Thus, job B is prepared in parallel with the printing of job A. However, because the printing time of job A is shorter than the preparation time for job B, the press stops 300 after printing job A, and waits for the preparation of job B to be completed. When job B begins printing, the preparation of job C also begins. However, the press stops 300 again after printing job B, because the preparation time of job C exceeds the printing time of job B. The press then resumes printing job C after job C is finished being prepared. In the parallel production mode, therefore, non-printing time 300 for the press is shorter than in the serial production mode, which results in improved press productivity.

In the optimized parallel production mode enabled by implementing a job ordering algorithm 210, the jobs are printed in an order that optimizes press productivity. In the FIG. 3 example, the algorithm 210 orders the jobs so that job C prints first, followed by job B, and then job A. As shown in the illustration, the only non-printing time 300 the press experiences is at the beginning, during the time that job C is being prepared. Job C begins printing after it is prepared, and at the same time, the preparation of job B begins. It is noteworthy that the print time for job C is long enough to cover the full preparation time of job B, and part of the preparation time of job A. Therefore, the press 100 does not stop printing after job C is finished printing, but instead, it immediately begins printing job B. Likewise, because the preparation of job A is completed prior to the end of printing job B, the press does not stop printing after printing job B, but instead immediately begins printing job A. Thus, the job ordering algorithm 210 arranges the jobs into an ordered print queue 212 that provides a maximum overlap of the job preparation time with the job printing time. This minimizes the non-printing time 300 for the press 100 and optimizes press productivity.

Figure 4:
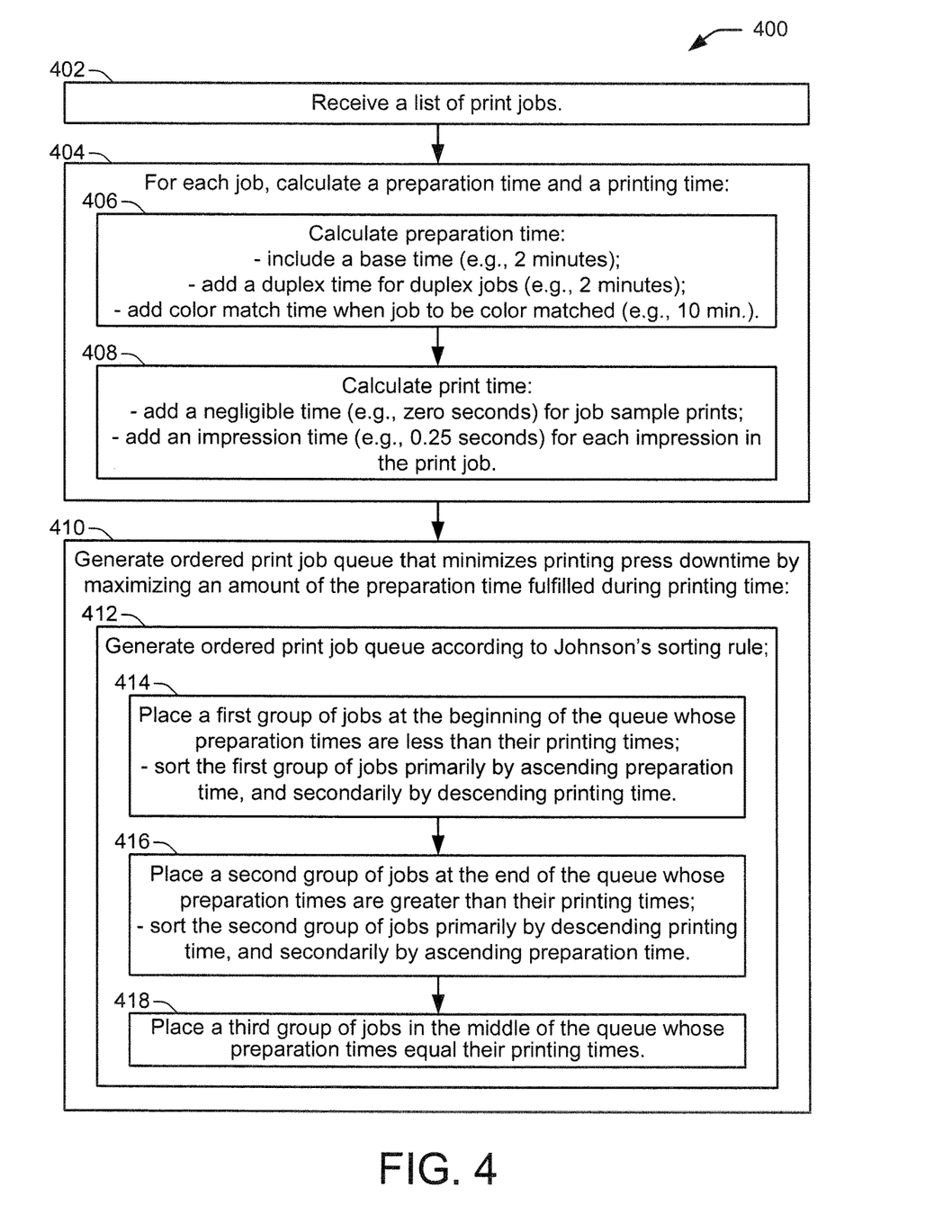
FIGS. 4 and 5 show flowcharts of example methods related to a print job ordering algorithm that generates an ordered print job queue that allows print jobs to be prepared while other jobs are printing.
Figure 5:
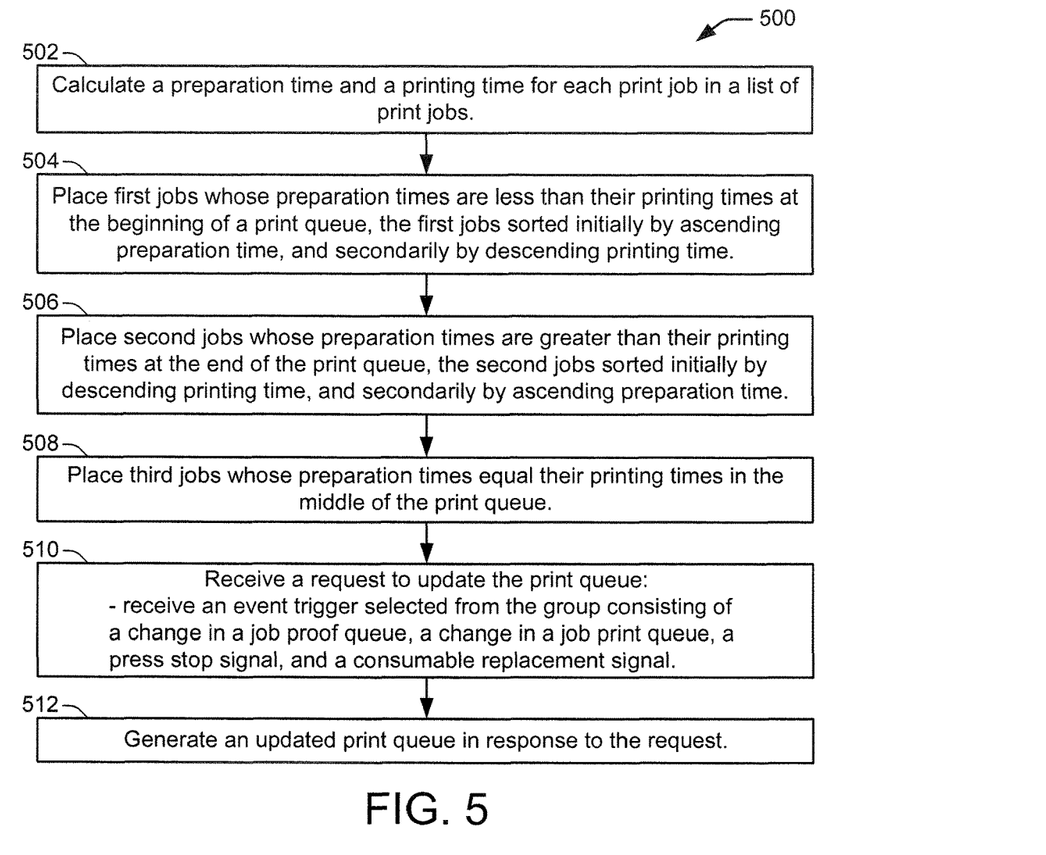

FIGS. 4 and 5 show flowcharts of example methods 400 and 500, related to a print job ordering algorithm 210 that generates an ordered print job queue 212 that allows print jobs to be prepared (e.g., proofed and color matched) while other jobs are printing. Methods 400 and 500, are associated with the example implementations discussed above with regard to FIGS. 1-3, and details of the steps shown in methods 400 and 500, can be found in the related discussion of such implementations. The steps of methods 400 and 500, may be embodied as programming instructions stored on a non-transitory computer/processor-readable medium, such as memory 202 of FIG. 2. In different examples, the implementation of the steps of methods 400 and 500, is achieved by the reading and execution of such programming instructions by a processor, such as processor 200 of FIG. 2. Methods 400 and 500, may include more than one implementation, and different implementations of methods 400 and 500, may not employ every step presented in the flowcharts. Therefore, while steps of methods 400 and 500, are presented in a particular order within the flowcharts, the order of their presentation is not intended to be a limitation as to the order in which the steps may actually be implemented, or as to whether all of the steps may be implemented. For example, one implementation of method 400 might be achieved through the performance of a number of initial steps, without performing one or more subsequent steps, while another implementation of method 400 might be achieved through the performance of all of the steps.

Referring to FIG. 4, method 400 begins at block 402, where the first step shown is to receive a list of print jobs. Print data received at a printing press 100 is often in the form of a group of print jobs that are not in any particular order and that have typically not been prepared (e.g., proofed, color matched) or otherwise approved for printing. A preparation time and a printing time are then calculated for each of the print jobs, as shown at block 404. Some jobs may already have been prepared, in which case the preparation time is zero. The preparation time and printing time are calculated based on different parameters of the print job, and they are estimates that depend in part on different amounts of time that can be applied by a job ordering algorithm to job preparation steps related to these parameters, such as proofing and color matching. As shown at block 406, for example, a job preparation time depends in part on whether the job is a simplex or duplex job, and whether or not the job calls for color matching. Calculating the preparation time starts with adding or including a "base time". While two minutes is used as the starting base time in this example, the base time can vary depending on different factors such as the type of printing press, the type of media substrate being used in the press, and so on. In general, the base time accounts for the time it takes to print a sample sheet and for the operator to perform a standard proof of the sample. The base time can be statistically learned or determined, for example, based on prior printing press operations.

Calculating the job preparation time further includes adding an amount of time to the base time if the job is a duplex job. This "duplex time" comprises the amount of time needed to print the duplex side of the job. In this example, the duplex time to be added to the base time is two minutes, but in other implementations it can be different amounts of time. Calculating the job preparation time also includes adding an amount of time to the base time if the job calls for color matching. As noted above, color matching generally involves the printing of several samples while an operator reviews each sample and iteratively adjusts the color registration of the press between each sample until the color matching is correct. The "color matching time" added to the base time in this example is ten minutes, but in other implementations it can be different amounts of time. As with the base time, the duplex time and color matching time can be statistically learned or determined based on prior printing press operations.

The method 400 continues at block 408, with calculating a print time for the job. As shown at block 408, when the job calls for a sample sheet, a negligible time is added to the printing time. In one example, a negligible time is zero seconds. However, when the job is to be printed in its full quantity, an amount of time is added for each impression that will be made by the press during printing. In the present example implementation, the amount of impression time added for each printed impression is 0.25 seconds. However, in different implementations the impression time may vary, depending on the type of printing press, the type of media substrate being used in the press, and so on.

As shown at block 410, the method 400 includes generating an ordered print job queue 212 that is optimized to minimize the amount of downtime (i.e., non-printing time) of the press. The ordered print job queue is generated by maximizing the amount of preparation time that is fulfilled during printing time. That is, jobs are ordered in a print queue such that there is a maximum overlap between the job preparation time and the job printing time. The ordered print job queue is generated by employing Johnson's sorting rule, as shown in block 412.

Figure 6:
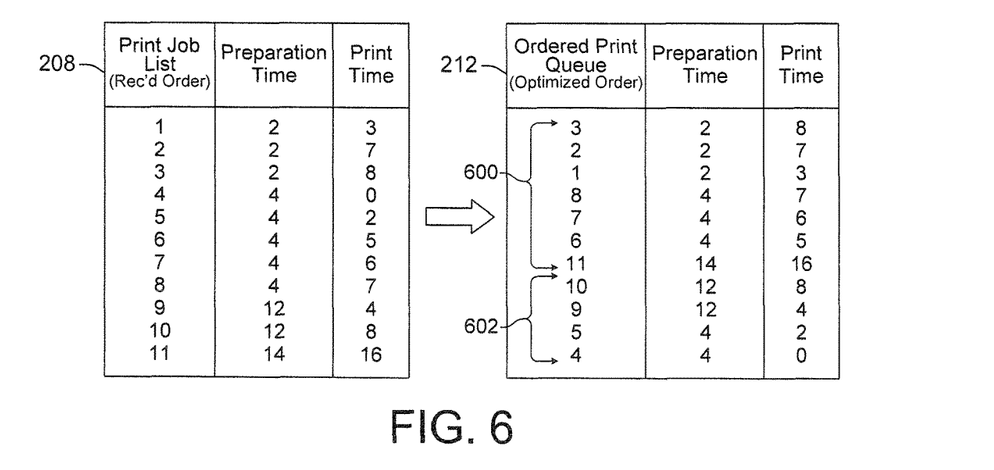
FIG. 6 shows an example of a print job list with print jobs in the order in which they were received by a printing press, along with an ordered print queue where the jobs are in an optimized order based on the application of Johnson's sorting rule to calculated preparation and print times.

FIG. 6 shows an example of a print job list 208 with print jobs in the order in which they were received by the printing press 100, along with an ordered print queue 212 where the jobs are in an optimized order based on the application of Johnson's sorting rule to the calculated preparation and print times. Referring now to both FIGS. 4 and 6, in the example implementation shown, the application of Johnson's sorting rule includes placing a first group of jobs 600 at the beginning of the ordered print queue 212 whose preparation times are less than their printing times, as shown at block 414. Within this first group of jobs 600, the jobs are sorted primarily (or first) by ascending preparation time, and second by descending printing time. As shown at block 416, the application of Johnson's sorting rule places a second group of jobs 602 at the end of the queue 212 whose preparation times are greater than their printing times. Within this second group of jobs 602, the jobs are sorted primarily (or first) by descending printing time, and second by ascending preparation time. As shown at block 418, the application of Johnson's sorting rule places a third group of jobs in the middle of the queue whose preparation times equal their printing times. While there is no third group of jobs shown in FIG. 6, a third group would fit into the ordered print queue 212 in between the first group of jobs 600 and the second group of jobs 602. In other implementations, the third group of jobs whose preparation times equal their printing times might be placed elsewhere within the ordered print queue 212. That is, the placement of the third group of jobs is not limited to the middle of the ordered print queue 212.

Referring now to FIG. 5, method 500 begins at block 502, where the first step shown is to calculate a preparation time and a printing time for each print job in a list of print jobs. As shown at block 504, first jobs whose preparation times are less than their printing times are placed at the beginning of a print queue, and the first jobs are sorted initially by ascending preparation time, and secondarily by descending printing time. As shown at block 506 of method 500, second jobs whose preparation times are greater than their printing times are placed at the end of the print queue, and the second jobs are sorted initially by descending printing time, and secondarily by ascending preparation time. A third group of jobs whose preparation times are equal to their printing times are place in the middle of the print queue.

The method 500 continues at block 508, where a request to update the print queue is received. Such requests can be received as any of various event triggers such as one selected from the group consisting of a change in a job proof queue, a change in a job print queue, a press stop signal, and a consumable replacement signal. A change in the job proof queue includes an addition of a job to the initial job list received by the press, or a subtraction of a job from the initial job list received by the press. A change in the job print queue can include an addition of a job to the ordered print queue 212 (e.g., when an additional job is approved from the initial job list) and/or a subtraction of a job from the ordered print queue 212 (e.g., when a job from the queue 212 is finished printing). A press stop signal comprises a signal indicating that the press has stopped printing, for example, while it waits for the preparation and approval of a next job for printing. A consumable replacement signal comprises a signal that a consumable component of the press 100 has been replaced, such as the replacement of the image transfer blanket 124. As shown at block 510, an updated print queue is generated in response to the request to update the print queue.

What is claimed is:

1. A printing system, the system comprising:
a processor;
a memory accessible by the processor and storing a list of print jobs, and
an image forming device in communication with the processor and receiving print jobs from the processor in an order determined by the list of print jobs, wherein the processor, in response to a request to update the list of print jobs, automatically performs the following operations without intervention by a user:
identifies a list of print jobs;
for each job, calculates a preparation time and a printing time; and
performs a first sort of the list of print jobs, wherein the first sort:
places a first group of jobs at a beginning of a queue, where each job in the first group has a preparation time that is shorter than that job's printing time; and
places a second group of jobs at an end of the queue, where each job in the second group has a preparation time that is greater than that job's printing time; and
performs a second sort on clusters of jobs in the first group having the same preparation time to sort the clusters by descending printing time, wherein the processor causes a press to output a first printed sample sheet to a first tray and printed jobs to a second tray, wherein the first printed sample sheet is printed between sequential sheets of a print job and in response to user input via a user interface, the processor causes the press to output a second printed sample sheet to the first tray, the second sample sheet printed between sequential sheets of a print job and the second sample sheet is a sample sheet for a second job not currently being printed.

2. The system as in claim 1, wherein calculating a preparation time comprises:
including a base time;
adding a duplex time to the base time when the job is a duplex job; and
adding a color match time to the base time when the job is to be color matched.

3. The system as in claim 2, wherein including a base time comprises including two minutes.

4. The system as in claim 1, wherein adding a duplex time comprises adding two minutes.

5. The system as in claim 1, wherein adding a color match time comprises adding ten minutes.

6. The system as in claim 1, wherein calculating a printing time comprises:
adding zero seconds when the job calls for a sample; and otherwise, adding an impression time for each impression in the job.

7. The system as in claim 6, wherein adding an impression time comprises adding 0.25 seconds.

8. The system as in claim 1, wherein the user input includes a modification of printing parameters for the second job.

9. The system of claim 1, wherein the first sort further places a third group of jobs in a middle of the queue, where each job in the third group has a preparation time equal to that job's printing time.

10. The system of claim 1, wherein the system performs a third sort on clusters of jobs in the second group having the same printing time to sort the clusters by increasing preparation time.

11. A printing press comprising:
a list of print jobs; and
a job ordering algorithm executable on a processor to provide an ordered print job queue wherein jobs are prepared and printed at the same time, wherein the job ordering algorithm when executed on the processor causes the processor to:
perform a first sort of the list of print jobs, wherein the first sort:
places a first group of jobs at a beginning of a queue, where each job in the first group has a preparation time that is shorter than that job's printing time; and
places a second group of job at an end of the queue, where each job in the second group has a preparation time that is greater than that job's printing time; and
perform a second sort on clusters of jobs in the first group having the same preparation time to sort the clusters by descending printing time;
a job output tray to receive printed jobs;
a sample tray to receive job sample sheets; and
a user interface to display the ordered print job queue enabling an operator to prepare the jobs using the job sample sheets while the job output tray receives printed jobs, wherein the press outputs a job sample sheet for a next job to be printed while a current job prints.

12. The printing press as in claim 11, further comprising a touch sensitive display.

13. The press of claim 11, wherein the user interface accepts modification of printing parameters for the next job while the current job prints.

* * * * *

UNITED STATES PATENT AND TRADEMARK OFFICE
CERTIFICATE OF CORRECTION

PATENT NO. : 10,261,736 B2
APPLICATION NO. : 14/914488
DATED : April 16, 2019
INVENTOR(S) : Gideon Amir et al.

Page 1 of 1

It is certified that error appears in the above-identified patent and that said Letters Patent is hereby corrected as shown below:

In the Claims

In Column 10, Line 21, Claim 4, delete "claim 1," and insert -- claim 2, --, therefor.

In Column 10, Line 23, Claim 5, delete "claim 1," and insert -- claim 2, --, therefor.

Signed and Sealed this
Third Day of September, 2019

Andrei Iancu
*Director of the United States Patent and Trademark Office*